United States Patent [19]
Lai et al.

[11] Patent Number: 6,151,389
[45] Date of Patent: Nov. 21, 2000

[54] TELEPHONE

[75] Inventors: Jeffrey Lai, Taipei, Taiwan; Feng Zhang; Ziao-Yun Wang, both of Nanking, China

[73] Assignee: Inventec Corporation, Taipei, Taiwan

[21] Appl. No.: 09/294,322

[22] Filed: Apr. 20, 1999

[30] Foreign Application Priority Data

Dec. 14, 1998 [TW] Taiwan ................................. 87220802

[51] Int. Cl.[7] ................................................... H04M 1/00
[52] U.S. Cl. ......................... 379/156; 379/163; 379/164; 379/420
[58] Field of Search ..................................... 379/156, 158, 379/159–160, 165, 177, 187, 202, 164, 179, 372–373, 377, 163, 420, 423, 432

[56] References Cited

U.S. PATENT DOCUMENTS 5,590,185 12/1996 Sandler et al. .......................... 379/163

Primary Examiner—Duc Nguyen
Attorney, Agent, or Firm—Bacon & Thomas, PLLC

[57] ABSTRACT

A telephone, which includes a CPU connected to a keyboard thereof, a first switch connected between first and second telephone lines, second and third switches provided at the first and second telephone lines and connected to the CPU, the second and third switches each having a first contact at the respective output end connected to a fourth switch and a second contact connected to a fifth switch, which controls a hand-free circuit, wherein when the first and second telephone lines are called at the same time, the switches are controlled by the CPU for enabling a first user to pick up one call through the hand-free circuit or talking circuit and a second user to pick up the other call through the talking circuit or hand-free circuit, and a switching can be made through the keyboard to change the connection of the telephone lines between the talking circuit and the hand-free circuit.

4 Claims, 2 Drawing Sheets

TELEPHONE

BACKGROUND OF THE INVENTION

The present invention relates to a telephone, and more particularly to such a telephone that allows handset and hand-free functions to be simultaneously operated.

A regular telephone, as shown in FIG. 1, comprises a keyboard 100 having a set of function buttons (not shown). The keyboard 100 is connected to a CPU 110. The CPU 110 is connected to ringing circuits 120, and connected to the respective input ends of first and second switches (K2,K3) 150 and 160. The first and second switches (K2,K3) 150 and 160 control a respective telephone line (LINE1, LINE2) 130 and 140. The first contact at the output end of the first switch 150 and the second contact at the output end of the second switch 160 are respectively connected to a third switch (K5) 190. The third switch 190 controls a talking circuit 170 and a hand-free circuit 180. The second contact at the output end of the first switch 150 and the first contact at the output end of the second switch 160 are connected to a fourth switch (K4) 200 at a load-circuit. The third and fourth switches 190 and 200 are respectively connected to the CPU 110. When a call comes through the first telephone line 130, the CPU 110 is triggered to output a control signal SWCTL1 to the first and second switches 150 and 160, causing the first and second switches 150 and 160 to be turned to high potential and the input end of each of the first and second switches 150 and 160 to be respectively connected to the first contact at the respective output end, therefore the first telephone line 130 is connected to the talking circuit 170 or hand-free circuit 180 through the third switch 190, and at the same time the second telephone line 140 is connected to the load-circuit, which is at an open circuit status. When two calls come through the first telephone line 130 and the second telephone line 140, the button HOLD at the keyboard 100 is depressed to close the fourth switch 200 at the load-circuit, enabling the telephone lines 130 and 140 to be maintained in communication, thus one of the telephone lines 130 and 140 can be selected by depressing button LINE1 or button LINE2 at the keyboard 100. If the first telephone line 130 is selected, the first, second, third and fourth switches 150, 160, 170 and 180 are maintained connected to the first telephone line 130. If the second telephone line 140 is selected, the first and second switches 150 and 160 are connected to the respective second contacts, causing the first telephone line 130 to be held, and the second telephone line 140 to be connected to the talking circuit 170 or hand-free circuit 180 through the third switch 190. Although the first and second telephone lines 130 and 140 can be simultaneously connected, the called party can only use the talking circuit 170 or hand-free circuit 180 to talk to the calling party at one telephone lines 130 or 140. For example, when two persons simultaneously made a call, one call is picked up through the handset (or hand-free circuit), and the other call is held by means of the operation of the button HOLD. Through buttons LINE1 and LINE2, either call is selected. This design of telephone allows two calls to be received through the first and second telephone lines 130 and 140, however one call must be held on the line while the other is picked up through the handset or hand-free circuit.

SUMMARY OF THE INVENTION

The present invention has been accomplished to provide a telephone which eliminates the aforesaid drawback. According to one aspect of the present invention, a talking circuit control switch and a hand-free circuit control switch are separately provided, and controlled by a CPU, allowing the talking circuit and the hand-free circuit to be independently operated at the same time. According to another aspect of the present invention, buttons are provided at the keyboard of the telephone and operated to drive the CPU, causing the CPU to connect either telephone line to the talking circuit or hand-free circuit.

DETAILED DESCRIPTION OF THE PREFERRED EMBODIMENT

Figure 1:
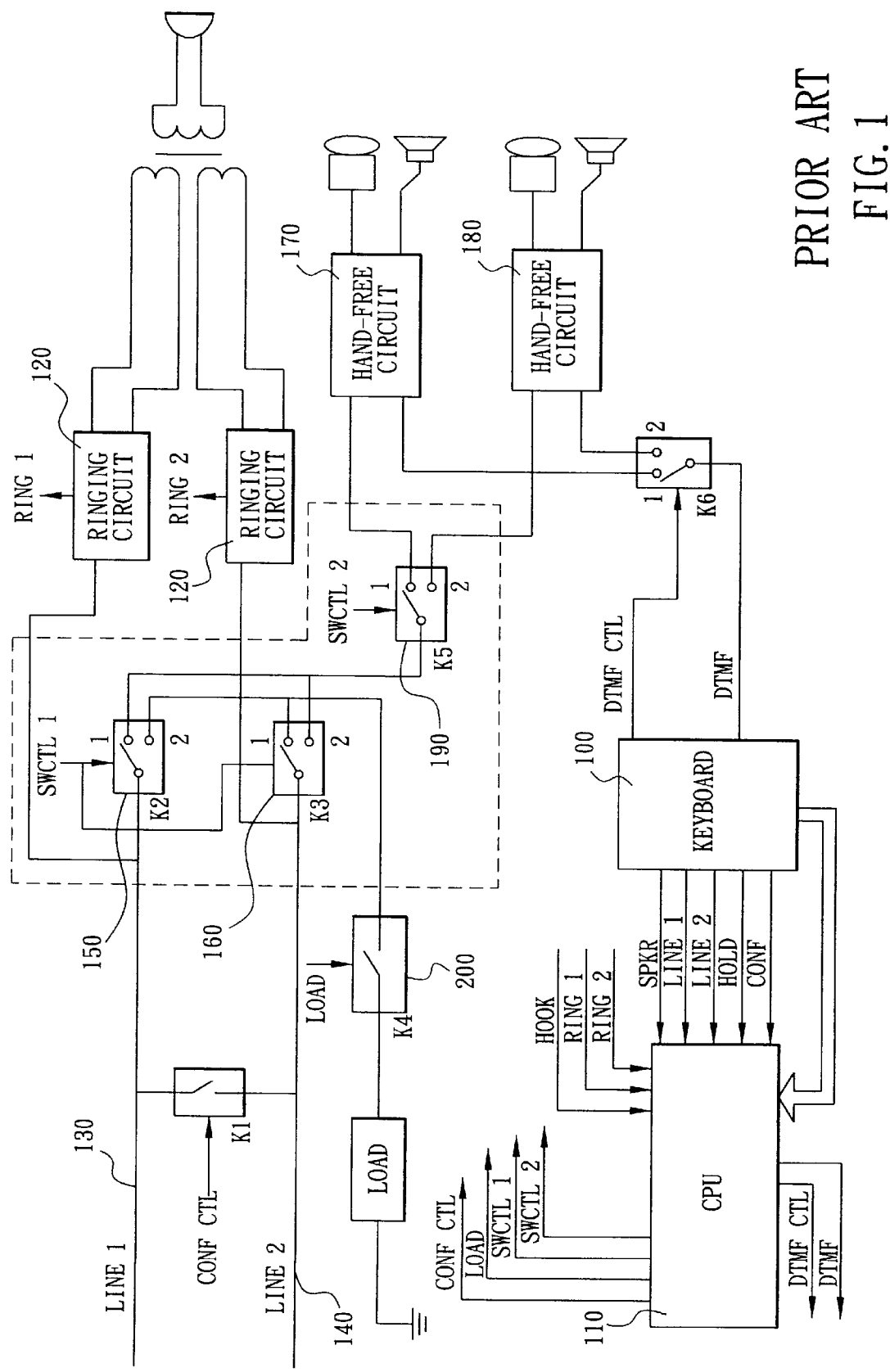
FIG. 1 is a circuit block diagram for a telephone according to the prior art.
Figure 2:
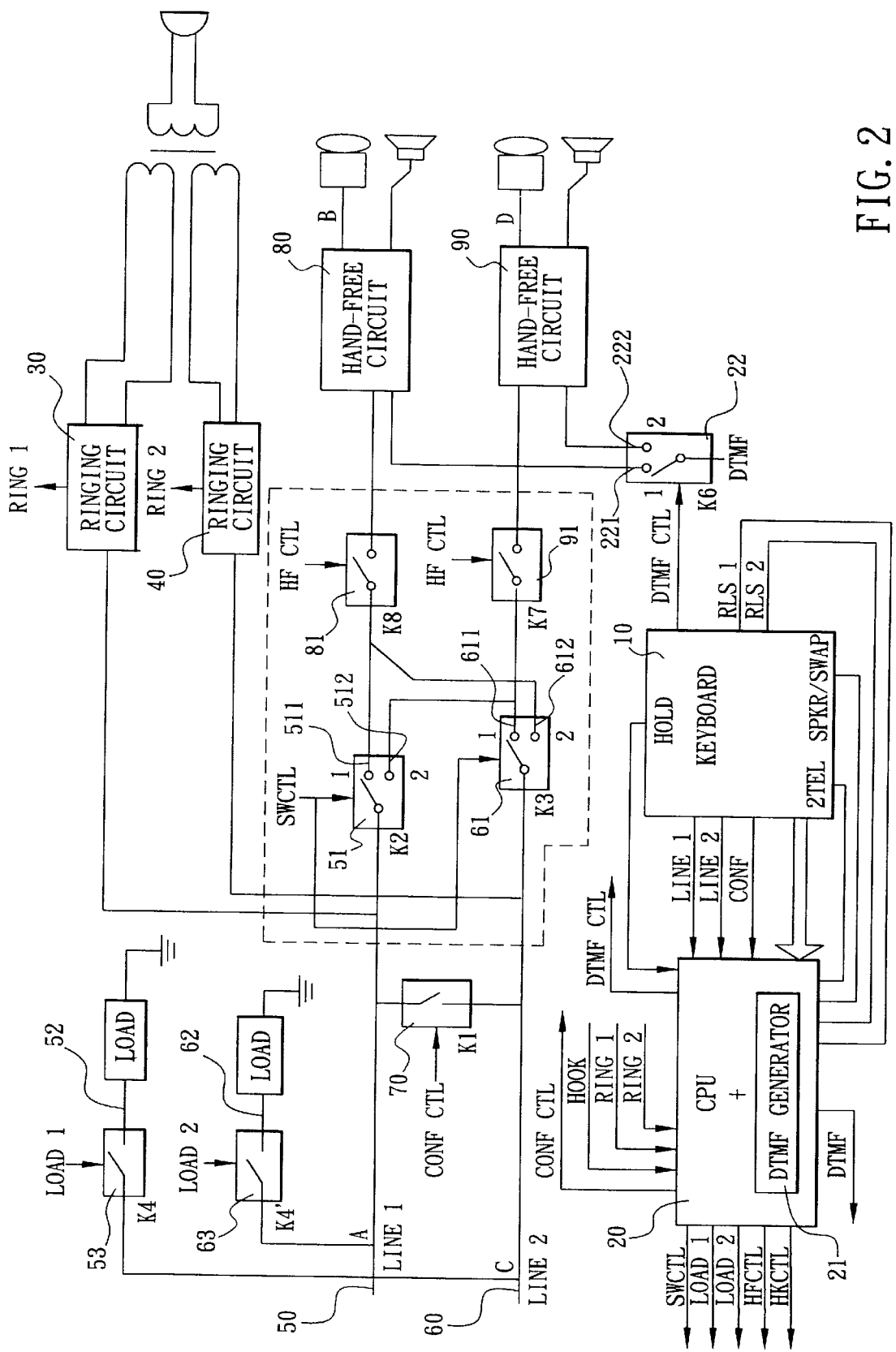
FIG. 2 is a circuit block diagram for a telephone according to the present invention.

A telephone in accordance with the present invention allows the user to simultaneously use the handset and hand-free functions. As illustrated in FIG. 2, the telephone comprises a keyboard 10, which comprises a plurality of push buttons including SPKR/SWAP button, LINE1 button, LINE2 button, HOLD button, 2TEL button, and CONF button. LINE1 button and LINE2 button represent two different telephone lines. HOLD button holds the connected telephone line in communication. CONF button is a conference telephone function control button. 2TEL button is to select if let hand-free circuit and talking circuit be respectively operated at the same time or not. SWAP button is used to switch between handset function and hand-free function. The keyboard 10 further comprises RLS1 button and RLS2 button for hanging up LINE1 and LINE2 respectively.

The keyboard 10 is connected to a CPU (central processing unit) 20. The CPU 20 is connected with a first ringing circuit 30 and a second ringing circuit 40. The first ringing circuit 30 and the second ringing circuit 40 are respectively connected to a first telephone line 50 and a second telephone line 60. The first telephone line 50 and the second telephone line 60 are respectively connected to the external exchange line. A first switch (K1) 70 is installed in a line, which is connected between the first telephone line 50 and the second telephone line 60. The first switch (K1) 70 is also connected to the CPU 20. Through the CPU 20 to switch on/off the first switch (K1) 70, the telephone lines 50 and 60 are closed/opened.

A second switch (K2) 51 and a third switch (K3) 61 are respectively installed in the first telephone line 50 and the second telephone line 60. The second switch (K2) 51 and the third switch (K3) 61 are respectively formed of a relay (any equivalent element may be used). The input end of the second switch (K2) 51 is connected to the first telephone line 50. The input end of the third switch (K3) 61 is connected to the second telephone line 60. The first contact 511 of the output end of the second switch (K2) 51 and the second contact 612 of the output end of the third switch (K3) 61 are respectively connected to a talking circuit 80. The second contact 512 of the output end of the second switch (K2) 51 and the first contact 611 of the output end of the third switch (K3) 61 are respectively connected to a hand-free circuit 90. The second switch (K2) 51 and the third switch (K3) 61 are also respectively connected to the CPU 20, so that the CPU 20 can connect the first telephone line 50 or second telephone line 60 to the talking circuit 80 or hand-free circuit 90 through the second switch (K2) 51 or third switch (K3) 61.

A fourth switch (K7) 81 is connected between the talking circuit 80 and the second switch (K2) 51. A fifth switch (K8)

91 is connected between the hand-free circuit 90 and the third switch (K3) 61. The fourth switch (K7) 81 and the fifth switch (K8) 91 are respectively formed of a triode (any equivalent element may be used). The fourth switch (K7) 81 and the fifth switch (K8) 91 are respectively connected to the CPU 20.

Further, the first telephone line 50 and the second telephone line 60 are respectively connected to a first load-circuit 52 and a second load-circuit 62. A sixth switch (K4) 53 and a seventh switch (K4') 63 are respectively installed in the first load-circuit 52 and the second load-circuit 62, and respectively connected to the CPU 20. Therefore, the CPU 20 can control the sixth switch (K4) 53 and the seventh switch (K4') 63, enabling the talking circuit 80 and the hand-free circuit 90 to be held when the sixth switch (k4) 53 and the seventh switch (k4') 63 are closed. When the sixth switch (k4) 53 and the seventh switch (k4') 63 are broken, the load-circuits 52 and 62 are released, enabling the talking circuit 80 and the hand-free circuit 90 to be reset.

The CPU 20 comprises a DTMF generator 21 connected to the input end of an eighth switch (K6) 22. The first contact 221 and second contact 222 of the output end of the eighth switch (K6) 22 are respectively connected to the talking circuit 80 and the hand-free circuit 90. Therefore, signal from the DTMF generator 21 is sent through the eighth switch (K6) 22 to the talking circuit 80 or hand-free circuit 90.

Referring to FIG. 2 again, when the first ringing circuit 30 is triggered to output a signal RING1, LINE1 flashes, informing an user (hereinafter called as Person A) of a telephone call from a caller (hereinafter called as Person B) at the first telephone line 50. When Person A picks up the handset, the hook release circuit (not shown) produces a signal HOOK, and sends the signal HOOK to the CPU 20. Upon receipt of the signal HOOK from the hook release circuit, the CPU 20 produces control signals SWCTL and HKCTL. The control signal SWCTL is sent to the second switch 51, causing the input end of the second switch 51 to be connected to the first contact 511 at the output end of the second switch 51, and the input end of the third switch 61 to be connected to the first contact 611 at the output end of the third switch 61. The control signal HKCTL is sent to the fourth switch 81, causing the fourth switch 81 to be closed. Therefore, Person A and Person B can talk to each other through the talking circuit 80. When the second ringing circuit 40 is triggered to output a signal RING2 during conversation between the first party and the second party, LINE 2 flashes, informing another user (hereinafter called as Person D) of a telephone call from a caller (hereinafter called as Person C) at the second telephone line 60. Person D can then push the button 2TEL. When the button 2TEL is pressed on, the CPU 20 is driven to output a control signal HFCTL to the fifth switch 91, causing the fifth switch 91 to be closed. Thus, Person C and Person D can talk to each other through the hand-free circuit 90 during conversation between Person A and Person B, i.e., the talking circuit 80 and the handfree circuit 90 are independently used at the same time.

When Person A and Person B talks to each other through the talking circuit 90, Person C and Person D talks to each other through the hand-free circuit 90, the button HOLD can be depressed to drive the CPU 20 to output signals LOAD1 and LOAD2 to the sixth switch 53 and the seventh switch 63, causing the sixth switch 53 and the seventh switch 63 to be closed. When the sixth switch 53 and the seventh switch 63 are closed, the first telephone line 50 and the second telephone line 60 are respectively connected to the load-circuits 52 and 62, enabling the telephone lines to be maintained in communication. The button SPKR/SWAP is then depressed to drive the CPU 20 to output signals SWCTL, LOAD1 and LOAD2. The signal SWCTL is sent to the second switch 51, causing the input end of the second switch 51 to be switched from the first contact 511 at the output end of the second switch 51 to the second contact 512 at the output end of the second switch 51, and the input end of the third switch 61 to be switched to the second contact 612 at the output end of the third switch 61. The signal LOAD1 and the signal LOAD2 are respectively sent to the sixth switch 53 and the seventh switch 63, causing the sixth switch 53 and the seventh switch 63 to be switched off. When the sixth switch 53 and the seventh switch 63 are switched off, the load-circuits 52 and 62 are released, and the talking circuit 80 is reset, therefore Person A and person B can talk to each other through the hand-free circuit 90, person C and D can talk to each other through the talking circuit 80.

Further, for a four-party conference, the button CONF is depressed to drive the CPU 20 to output a signal CONF to the first switch 70, causing the first switch 70 to be closed, and therefore the four persons are allowed to make a telephone conference.

In order for further understanding of the present invention, an application example is described hereinafter.

When Person C calls person D through the other telephone line during a talk between Person A and Person B through the handset, person D immediately presses on button 2TEL at the keyboard 10 so as to communicate with Person C through the hand-free circuit 90. If Person A and Person B do not want other to hear their conversation, Person A can press on button HOLD and button 2TEL so as to talk to Person B through the hand-free circuit, leaving Person C and Person D to talk to each other through the talking circuit 80. If Person A, Person B, Person C and Person D wish to make a conference, button CONF at the keyboard 10 is depressed.

It is apparent that although the invention has been described in connection with the preferred embodiment, it is contemplated that those skilled in the art may make changes to the preferred embodiment without departing from the scope of the invention as defined in the appended claims.

What is claimed is:

1. A telephone comprising:
    a keyboard having a set of function buttons;
    a CPU (central processing unit);
    at least two telephone lines each connected to a respective ringing circuit, said at least two telephone lines each having a switch respectively connected to said CPU;
    a talking circuit connected to said at least two telephone lines through a switch having an input end connected to a first contact at an output end of the switch at each of said telephone line;
    a hand-free circuit connected to said at least two telephone lines through a switch having an input end connected to a second contact at the output end of the switch at each of said telephone line;
    wherein when said at least two telephone lines are busy, the function buttons of said keyboard are operated to drive said CPU to output control signals to the switches at said at least two telephone lines, said talking circuit and said hand-free circuit, enabling one of said at least two telephone lines to be connected to said hand-free circuit or said talking circuit, so that said talking circuit and said hand-free circuit can be independently operated.

2. The telephone of claim 1 wherein said at least two telephone lines are each connected to a respective load-circuit, said load-circuit having a switch connected to said CPU so that said CPU can be controlled to close the switch at the load-circuit at each of said at least two telephone lines, enabling said talking circuit and said hand-free circuit to be held, or to open the switch at the loading-circuit at each of said at least two telephone lines, enabling said talking circuit and said hand-free circuit to be reset.

3. The telephone of claim 1 wherein said CPU comprises a DTMF generator connected to said talking circuit and said hand-free-circuit through a switch, which is controlled through said function buttons at said keyboard to send output signal from said DTMF to said talking circuit or said hand-free circuit.

4. The telephone of claim 1 further comprising a switching circuit connected between said at least two telephone lines and controlled by said function keys through said CPU to connect/disconnect the connection between each two of said at least two telephone lines.

* * * * *